Figure 1:
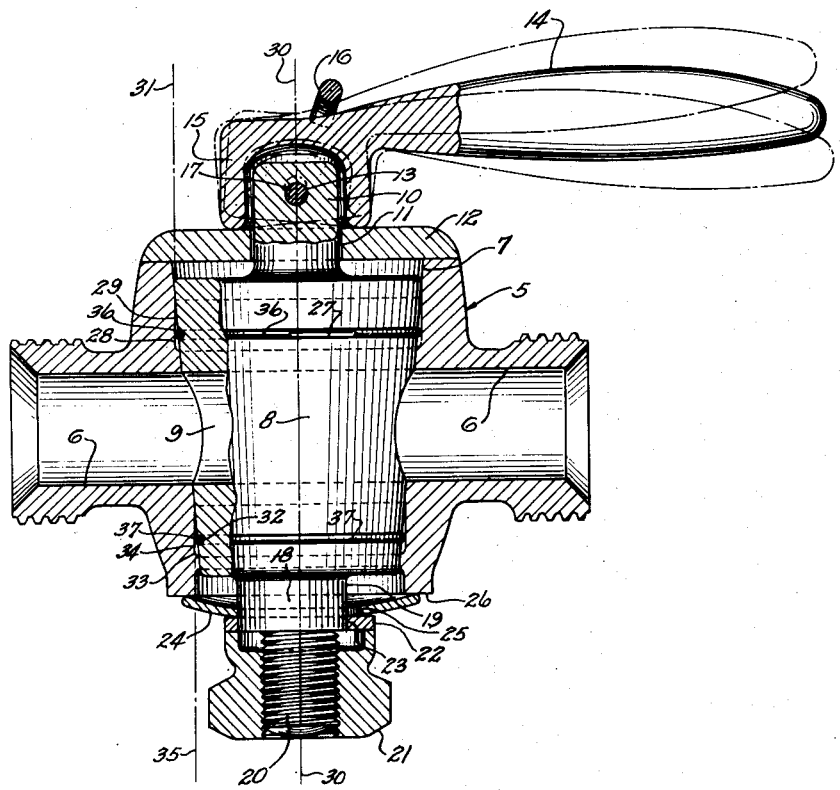

Oct. 28, 1952

F. HINRICHS 2,615,672

SEAL FOR AXIALLY MOVABLE ROTARY PLUG VALVES

Filed Nov. 19, 1948

INVENTOR.
Ferdinand Hinrichs
BY
ATTORNEYS.

Patented Oct. 28, 1952

2,615,672

UNITED STATES PATENT OFFICE 2,615,672

SEAL FOR AXIALLY MOVABLE ROTARY PLUG VALVES

Ferdinand Hinrichs, Kenosha, Wis., assignor to Tri-Clover Machine Co., Kenosha, Wis., a corporation of Wisconsin Application November 19, 1948, Serial No. 61,034

9 Claims. (Cl. 251—97)

This invention relates to improvements in seals for plug valves, and more particularly but not exclusively to seals for valves of the lift plug type.

Plug valves have found extensive application in the food and dairy industries because of their simplicity of construction and the ease with which they can be quickly disassembled and cleaned.

When lift plug valves are employed in conduits containing liquids under high pressure, a certain amount of leakage takes place each time the plug of one of these valves is lifted. This is, of course, objectionable not only because of the loss of the liquid, but is also objectionable from the sanitary standpoint.

It is therefore a general object of the invention to provide a plug valve having sealing means to prevent leakage therefrom.

A further object of the invention is to provide an improved seal for plug valves which effectively prevents leakage regardless of the position of the valve plug in said valve.

A further object of the invention is to provide an improved seal for plug valves, the efficiency of which is unaffected by wear on the valve plug and valve body.

A further, more specific object of the invention is to provide an improved lift plug valve wherein the tapered plug thereof is formed with circumferential grooves above and below the port thereof, in each of which is seated an annular sealing ring and wherein the tapered plug receiving bore of the valve body is formed with grooves for coaction with said sealing rings, said grooves each having a cylindrical surface coaxial with the plug receiving bore.

With the above and other objects in view, the invention consists of the improved seal for plug valves, and all of its parts and combinations, as set forth in the claims, and all equivalents thereof.

Figure 2:
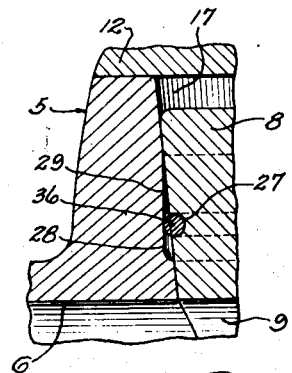

In the drawing accompanying and forming a part of this specification, wherein is shown one complete embodiment of the preferred form of the invention, and wherein the same reference characters indicate the same parts in both of the views:

Fig. 1 is a vertical sectional view taken through a lift plug valve embodying the invention; and Fig. 2 is a fragmentary enlargement of a portion of Fig. 1.

Referring to the drawing, it will be noted that the lift plug valve therein shown is a modification of the valve which forms the subject matter of my copending application, Serial No. 732,809, filed March 6, 1947. This particular valve is shown for illustrative purposes only, since the invention is applicable to plug valves generally.

Referring to Fig. 1, the numeral 5 indicates a valve body having a longitudinal fluid conducting bore 6, and having a transverse tapered plug receiving bore 7. A tapered valve member or plug 8 is seated in the tapered bore 7 and is provided with the usual fluid conducting port or bore 9 which is adapted to be brought into and out of alinement with the fluid conducting bore 6 of the body when the plug is rotated.

The upper end of the plug 8 has a stem 10 projecting axially from the center thereof. The stem 10 projects rotatably through a circular opening 11 in a cover plate 12. The stem 10 is formed with a transverse aperture 13.

A handle member 14 is formed at one end with an inverted cup-shaped portion 15 which fits over the upper end of the stem 10 and rests on the plate 12. The side walls of the cup-shaped portion 15 are apertured adjacent the ends of the aperture 13 in the stem 10. The handle 14 is pivotally connected to the stem 10 by means of a clip 16 having a portion 17 which extends transversely through the apertures in the side walls of the cup-shaped portion 15 and through the aperture 13 in the stem 10.

Projecting axially from the bottom of the plug 8 is a stem 18 which is preferably formed with a flat side 19. Below the stem portion 18 is an externally threaded portion 20 of reduced diameter for receiving an adjustment nut 21. The adjustment nut 21 preferably acts against the lower face of a washer 22 which has an opening 23 shaped to fit the cross-section of the stem 18. The washer 22, therefore, rotates with the plug 8. A yielding concavo-convex disc 24 having a central opening 25 is positioned on the stem portion 18 above the washer 22. The periphery of the disc 24 engages the annular end 26 at the bottom of the valve body 5. It is apparent that when the nut 21 is adjusted to compress the disc 24, said disc will urge the plug 8 into seated condition in the bore 7.

Formed in the tapered outer surface of the plug 8 above the bore 9 is a circumferential groove 27. Formed in the plug-receiving bore of the valve body 5 adjacent the groove 27 in the plug 8 is an annular groove 28. The groove 28 has a cylindrical bottom surface 29 which is coaxial with the bore 7 and which preferably extends above and below the groove 27. It is thus apparent that the surface 29 is parallel with the axis 30 of the bore 7 and the plug 8, as indicated by the dot and dash line extension 31 of the surface 29.

Formed in the tapered outer surface of the plug 8 below the bore 9 is a circumferential groove 32. Formed in the plug receiving bore 17 adjacent the groove 32 is an annular groove 33. The groove 33 is similar to the groove 28 and has a cylindrical bottom surface 34 which is coaxial with the bore 7 and which preferably extends above and below the groove 32. As indicated by the dot and dash line extension 35 of the surface 34, said surface is also parallel with the axis 30 of the bore 17 and the plug 8.

Positioned in the groove 27 and slightly compressed into sealing engagement with the surface 29 is a sealing ring 36, of rubber or "neoprene," or other suitable material, said sealing ring being preferably round in cross-section. Positioned in the groove 32 and slightly compressed into sealing engagement with the surface 34 is a sealing ring 37 which is like the sealing ring 36.

In operation, it is usually necessary, in order to turn the plug 8 in an opening or closing direction, to first lift said plug slightly from its seated position in the bore 7. In the valve shown in Fig. 1, this is accomplished by an upward or downward force on the handle 14 which causes movement thereof to one of the dot and dash line positions shown. As the plug 8 moves upwardly, the sealing rings 36 and 37 slide upwardly along the cylindrical surfaces 29 and 34 respectively while maintaining their sealing engagement with said surfaces. It is thus apparent that the sealing rings 36 and 37 effectively prevent any leakage of fluid around the plug during a plug lifting operation.

Since the sealing rings 36 and 37 coact with cylindrical surfaces which are parallel to the axis 30, said sealing rings are urged into sealing engagement with said surfaces at a constant pressure regardless of the vertical position of the plug 8. As the plug 8 becomes slightly reduced in diameter due to wear, it will move downwardly within the bore 7. Since the cylindrical surface portions of the grooves 28 and 33 extend below as well as above the sealing rings 36 and 37 when the plug 8 is seated in the bore 7, as shown in Fig. 1, downward movement of the plug 8 in the bore 7 due to wear will have substantially no effect upon the efficiency of the seal provided by the sealing rings 36 and 37. It is thus apparent that the seals have utility in connection with ordinary plug valves as well as with lift plug valves.

The improved valve is well adapted for use in the food and dairy industries by reason of the fact that it retains the simplicity of construction inherent in plug valves and is quickly and easily disassembled and cleaned. By providing a means for preventing leakage when the plug is unseated, the improved valve may incorporate all of the advantageous features of a lift plug valve without the usual disadvantageous features thereof.

Various changes and modifications may be made without departing from the spirit of the invention, and all of such changes are contemplated, as may come within the scope of the claims.

What I claim is:

1. In a valve, a valve body formed with a fluid-conducting bore and with a transverse, tapered plug-receiving bore intersecting said fluid-conducting bore, said tapered bore being formed with an annular groove intermediate the length thereof and at one side of said fluid-conducting bore, said groove having a cylindrical bottom surface portion which is straight in an axial direction; an axially movable tapered plug in said tapered bore having a port adapted to be brought into and out of registration with said fluid-conducting bore; sealing means on said plug substantially less width than the width of said straight cylindrical surface portion in sealing engagement with the straight cylindrical surface portion of said annular groove, and means on said plug for retaining said seal against movement relative to said plug.

2. In a valve, a valve body formed with a fluid-conducting bore and with a transverse, tapered plug-receiving bore intersecting said fluid-conducting bore, said tapered bore being formed with an annular groove at one side of said fluid-conducting bore, said groove having a cylindrical bottom surface portion which is straight in an axial direction and which meets and is coaxial with said tapered bore; an axially and rotatably movable tapered plug in said tapered bore having a port adapted to be brought into and out of registration with said fluid-conducting bore; and sealing means on said plug in sealing engagement with the straight cylindrical surface portion of said annular groove.

3. In a valve, a valve body formed with a fluid conducting bore and with a transverse, tapered plug-receiving bore intersecting said fluid-conducting bore, said tapered bore being formed with an annular groove intermediate the length thereof at one side of said fluid conducting bore, said groove having a cylindrical bottom surface portion which is straight in an axial direction coaxial with said tapered bore the largest diameter portion of said tapered bore being at least equal to the diameter of the bottom surface portion of said cylindrical groove; an axially and rotatably movable tapered plug in said tapered bore having a port adapted to be brought into and out of registration with said fluid-conducting bore; a sealing ring carried by said plug in sealing engagement with the straight cylindrical surface portion of said annular groove, said straight surface portion having a width substantially greater than the width of said sealing ring, and means on said plug for retaining said seal against movement relative to said plug.

4. In a valve, a valve body formed with a fluid-conducting bore and with a transverse tapered plug-receiving bore intersecting said fluid-conducting bore, said tapered bore being formed with an annular groove at one side of said fluid-conducting bore, said groove having a cylindrical bottom surface portion which is straight in an axial direction and which meets and is coaxial with said tapered bore; an axially and rotatably movable tapered plug in said tapered bore having a port adapted to be brought into and out of registration with said fluid-conducting bore, said plug being formed with a circumferential groove adjacent the cylindrical surface of said tapered bore groove; and a sealing ring carried by said plug and seated in said plug groove, said sealing ring normally being positioned in sealing engagement with said straight cylindrical surface portion.

5. In a valve, a valve body formed with a fluid-conducting bore and with a transverse tapered plug-receiving bore intersecting said fluid-conducting bore, said tapered bore being formed with an annular groove intermediate the length thereof at one side of said fluid-conducting bore, said groove having a cylindrical bottom surface portion which is straight in an axial direction and coaxial with said tapered bore; an axially and rotatably movable tapered plug in said tapered bore having a port adapted to be brought into and out of registration with said fluid conducting bore, said plug being formed with a circumferential groove adjacent the cylindrical surface of said tapered bore groove; and a sealing ring carried by said plug and seated in said plug groove, said sealing ring normally being positioned in sealing engagement with said straight cylindrical surface intermediate the width thereof said straight surface portion having a width substantially greater than the width of said sealing ring.

6. In a valve, a valve body formed with a fluid-conducting bore and with a transverse tapered plug-receiving bore intersecting said fluid-conducting bore, said tapered bore being formed with an annular groove on each side of said fluid-conducting bore, each of said grooves having a cylindrical bottom surface portion which is straight in an axial direction and which meets said tapered bore; a tapered plug in said tapered bore, said plug having a port adapted to be brought into and out of registration with said fluid-conducting bore and being formed with a circumferential groove adjacent each of the grooves in the tapered bore; and sealing means in each circumferential groove of the plug in sealing engagement with the straight cylindrical surface portions of said tapered bore grooves.

7. In a valve, a valve body formed with a fluid-conducting bore and with a transverse tapered plug-receiving bore intersecting said fluid-conducting bore, said tapered bore being formed with an annular groove intermediate the length thereof on each side of said fluid-conducting bore, each of said grooves having a cylindrical surface portion which is straight in an axial direction and coaxial with said bore; an axially and rotatably movable tapered plug in said tapered bore, said plug having a port adapted to be brought into and out of registration with said fluid conducting bore and being formed with a circumferential groove adjacent each of the grooves in the tapered bore; and sealing means in each circumferential groove of the plug in sealing engagement with the straight cylindrical surface portions of said tapered bore grooves, each of said straight surface portions having substantially greater width than the width of the corresponding sealing means.

8. In a valve, a valve body formed with a fluid-conducting bore and with a transverse tapered plug-receiving bore intersecting said fluid-conducting bore, said tapered bore being formed with an annular groove on each side of said fluid-conducting bore, each of said grooves having a cylindrical bottom surface portion which is straight in an axial direction and which meets and is coaxial with said tapered bore; an axially and rotatably movable tapered plug in said tapered bore, said plug being formed with a circumferential groove adjacent each of the grooves in the tapered bore; and a sealing ring carried by and seated in each of the grooves in said plug and in sealing engagement with said straight cylindrical surfaces.

9. In a valve, a valve body formed with a fluid-conducting bore and with a transverse tapered plug-receiving bore intersecting said fluid-conducting bore, said tapered bore being formed with an annular groove on each side of said fluid-conducting bore, each of said grooves having a cylindrical bottom surface portion which is straight in an axial direction and which meets and is coaxial with said tapered bore; an axially and rotatably movable tapered plug in said tapered bore, said plug being formed with a circumferential groove adjacent each of the grooves in the tapered bore; and a sealing ring carried by and seated in each of the grooves in said plug and normally positioned in sealing engagement with said cylindrical surfaces intermediate the width thereof.

FERDINAND HINRICHS.

REFERENCES CITED

The following references are of record in the file of this patent:

UNITED STATES PATENTS

| Number | Name | Date |
| --- | --- | --- |
| 1,661,432 | Lincoln | Mar. 6, 1928 |
| 1,892,835 | Hamer | Jan. 3, 1933 |
| 1,923,295 | Carpenter | Aug. 22, 1933 |
| 1,933,903 | Hamer | Nov. 7, 1933 |
| 2,187,477 | Oestreicher | Jan. 16, 1940 |
| 2,387,013 | Fuller | Oct. 16, 1945 |